United States Patent
Luck et al.

(10) Patent No.: US 9,954,971 B1
(45) Date of Patent: Apr. 24, 2018

(54) CACHE EVICTION IN A DISTRIBUTED COMPUTING SYSTEM

(71) Applicants: Hazelcast, Inc., Palo Alto, CA (US); Hazelcast Ltd., Istanbul (TR)

(72) Inventors: Greg Luck, Redwood City, CA (US); Christoph Engelbert, Remscheid (DE); Serkan Özal, Ankara (TR)

(73) Assignee: Hazelcast, Inc., Palo Alto, CA (US)

( * ) Notice: Subject to any disclaimer, the term of this patent is extended or adjusted under 35 U.S.C. 154(b) by 246 days.

(21) Appl. No.: 14/980,712

(22) Filed: Dec. 28, 2015

Related U.S. Application Data

(60) Provisional application No. 62/151,326, filed on Apr. 22, 2015.

(51) Int. Cl.
| | |
|---|---|
| *G06F 15/16* | (2006.01) |
| *H04L 29/08* | (2006.01) |
| *G06F 12/0891* | (2016.01) |
| *G06F 15/173* | (2006.01) |

(52) U.S. Cl.
CPC ...... *H04L 67/2842* (2013.01); *G06F 12/0891* (2013.01); *G06F 2212/60* (2013.01)

(58) Field of Classification Search
CPC ............. H04L 67/2842; G06F 12/0891; G06F 2212/60
USPC ........................................................ 709/213
See application file for complete search history.

(56) References Cited

U.S. PATENT DOCUMENTS

| | | | | |
|---|---|---|---|---|
| 6,718,438 B2* | 4/2004 | Lewis | ................... | G06F 12/121 711/129 |
| 7,536,512 B2* | 5/2009 | Chetuparambil | ...... | G06F 12/121 711/131 |
| 7,590,803 B2* | 9/2009 | Wintergerst | .......... | G06F 12/121 710/57 |
| 8,041,897 B2* | 10/2011 | Biles | ...................... | G06F 12/127 711/125 |
| 8,271,736 B2* | 9/2012 | Gupta | ................... | G06F 12/127 711/133 |
| 8,402,223 B2* | 3/2013 | Birka | ..................... | G06F 12/121 711/133 |
| 8,407,419 B2* | 3/2013 | Shea | ................... | G06F 12/0897 707/814 |
| 8,533,393 B1* | 9/2013 | Cote | .................... | G06F 12/0804 711/118 |
| 8,601,217 B2* | 12/2013 | Swart | ................... | G06F 12/0888 711/133 |
| 8,688,915 B2* | 4/2014 | Daly | ................... | G06F 12/0897 711/122 |
| 8,838,724 B2* | 9/2014 | Xie | ........................ | H04L 67/288 709/213 |

(Continued)

*Primary Examiner* — Melvin H Pollack
(74) *Attorney, Agent, or Firm* — Cooley LLP

(57) ABSTRACT

A cache server is operative as one of a set of cache servers of a distributed cache. The server includes a processor and a memory connected to the processor. The memory stores instructions executed by the processor to receive a cache storage request, establish a cache eviction requirement in response to the cache storage request, and identify an evict entry within a cache in response to the cache eviction requirement. The evict entry is selected from a random sampling of entries within the cache that are subject to an eviction policy that identifies a probabilistically favorable eviction candidate. The evict entry is removed from the cache. Content associated with the storage request is loaded into the cache.

11 Claims, 3 Drawing Sheets

(56) References Cited

U.S. PATENT DOCUMENTS

| | | | |
|---|---|---|---|
| 9,009,401 B2* | 4/2015 | Asamoto | G06F 12/122 |
| | | | 711/108 |
| 9,164,702 B1* | 10/2015 | Nesbit | G06F 3/067 |
| 9,304,923 B2* | 4/2016 | Tune | G06F 12/0817 |
| 9,354,989 B1* | 5/2016 | Sehgal | G06F 11/00 |
| 9,390,116 B1* | 7/2016 | Li | G06F 17/30336 |
| 9,405,706 B2* | 8/2016 | Doshi | G06F 12/126 |
| 9,444,752 B2* | 9/2016 | Backholm | H04L 47/32 |
| 9,460,025 B1* | 10/2016 | Wallace | G06F 12/0871 |
| 9,471,497 B2* | 10/2016 | Yang | G06F 12/0862 |
| 9,529,731 B1* | 12/2016 | Wallace | G06F 12/122 |
| 9,535,837 B2* | 1/2017 | Maddah-Ali | G06F 12/0813 |
| 9,639,479 B2* | 5/2017 | Nickolls | G06F 12/121 |
| 9,678,881 B2* | 6/2017 | Imai | G06F 12/0875 |
| 9,703,713 B2* | 7/2017 | Nadgowda | G06F 12/0833 |
| 9,747,592 B2* | 8/2017 | Lientz | H04L 41/0816 |
| 9,767,032 B2* | 9/2017 | Talagala | G06F 12/0891 |
| 9,769,280 B2* | 9/2017 | Gupta | H04L 67/2852 |
| 9,792,226 B2* | 10/2017 | Frachtenberg | G06F 12/121 |
| 2013/0138795 A1* | 5/2013 | Field | H04N 21/2221 |
| | | | 709/224 |
| 2014/0143647 A1* | 5/2014 | Reshadi | G06F 17/30902 |
| | | | 715/234 |
| 2015/0350365 A1* | 12/2015 | Khakpour | H04L 67/2842 |
| | | | 709/213 |
| 2016/0259728 A1* | 9/2016 | Eddy | G06F 12/0811 |
| 2017/0163755 A1* | 6/2017 | Slocombe | H04L 67/288 |

* cited by examiner

CACHE EVICTION IN A DISTRIBUTED COMPUTING SYSTEM

CROSS-REFERENCE TO RELATED APPLICATION

This application claims priority to U.S. Provisional Patent Application Ser. No. 62/151,326, filed Apr. 22, 2015, the contents of which are incorporated herein by reference.

FIELD OF THE INVENTION

This application relates generally to data handling in a networked environment. More particularly, this invention relates to cache eviction in a distributed computing system.

BACKGROUND OF THE INVENTION

FIG. 1 illustrates a distributed computing system 100. The system 100 includes a set of client devices 102_1 through 102_N. Each client device 102 may be a computer, tablet, smart phone, wearable device and the like. A load balancer 104 may be used to manage access by the client devices 102 to a set of application servers 106_1 through 106_X. The application servers 106 access a set of cache servers 108_1 through 108_Y. The cache servers 108 access data store resources 110_1 through 110_Z. The data store resources 110 may be mainframe computers, web service servers, database servers and the like. The data store resources 110 persistently store data utilized by the application servers 106, while the cache servers 108 dynamically store content likely to be accessed by the application servers 106. Consequently, the content stored by the cache servers is constantly changing. Cache eviction refers to the operation of removing content from a cache in order to cache new content. Many cache eviction schemes rely upon data manipulation so that the data is ordered in the manner that it should be evicted. This may result in data being moved from one location to another, which can degrade system performance.

In view of the foregoing, it would be desirable to provide improved cache eviction techniques.

SUMMARY OF THE INVENTION

A cache server is operative as one of a set of cache servers of a distributed cache. The server includes a processor and a memory connected to the processor. The memory stores instructions executed by the processor to receive a cache storage request, establish a cache eviction requirement in response to the cache storage request, and identify an evict entry within a cache in response to the cache eviction requirement. The evict entry is selected from a random sampling of entries within the cache that are subject to an eviction policy that identifies a probabilistically favorable eviction candidate. The evict entry is removed from the cache. Content associated with the storage request is loaded into the cache.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
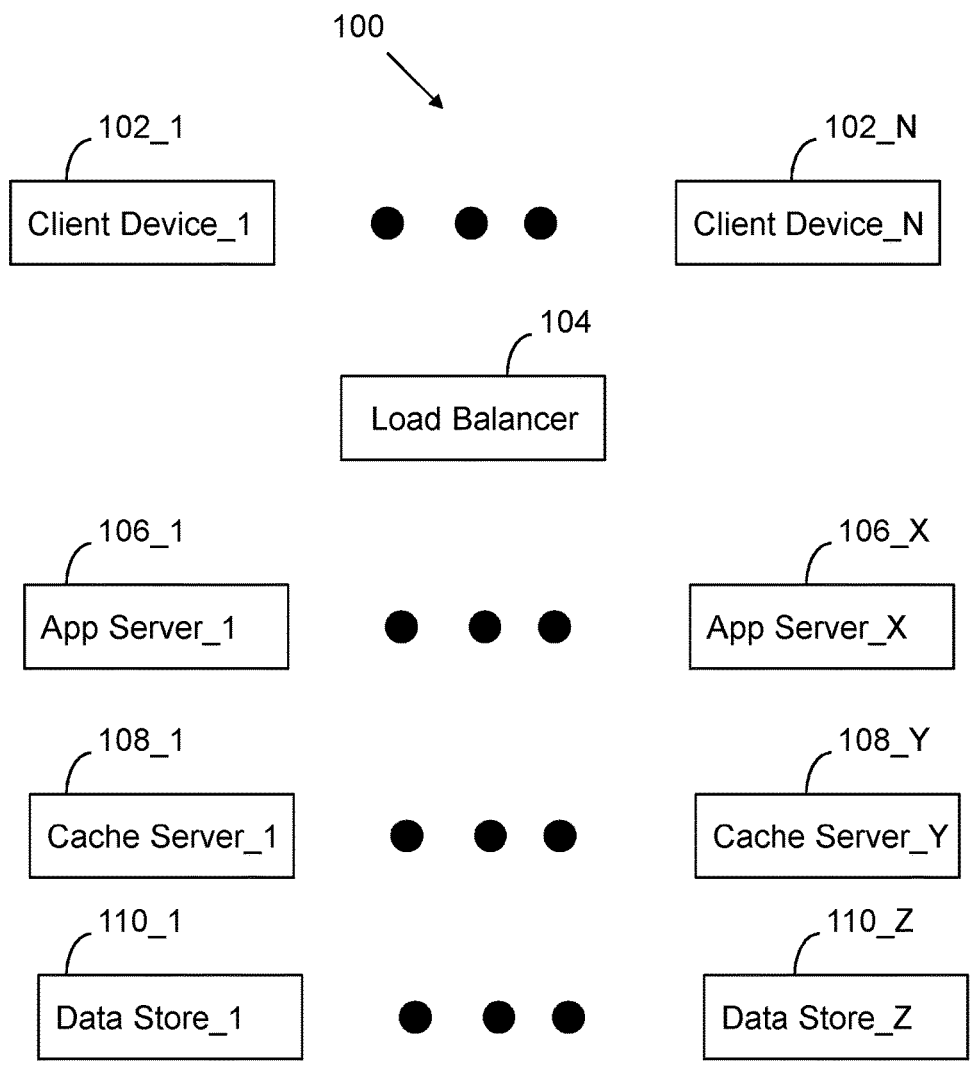
FIG. 1 illustrates a prior art distributed computing system.
Figure 2:
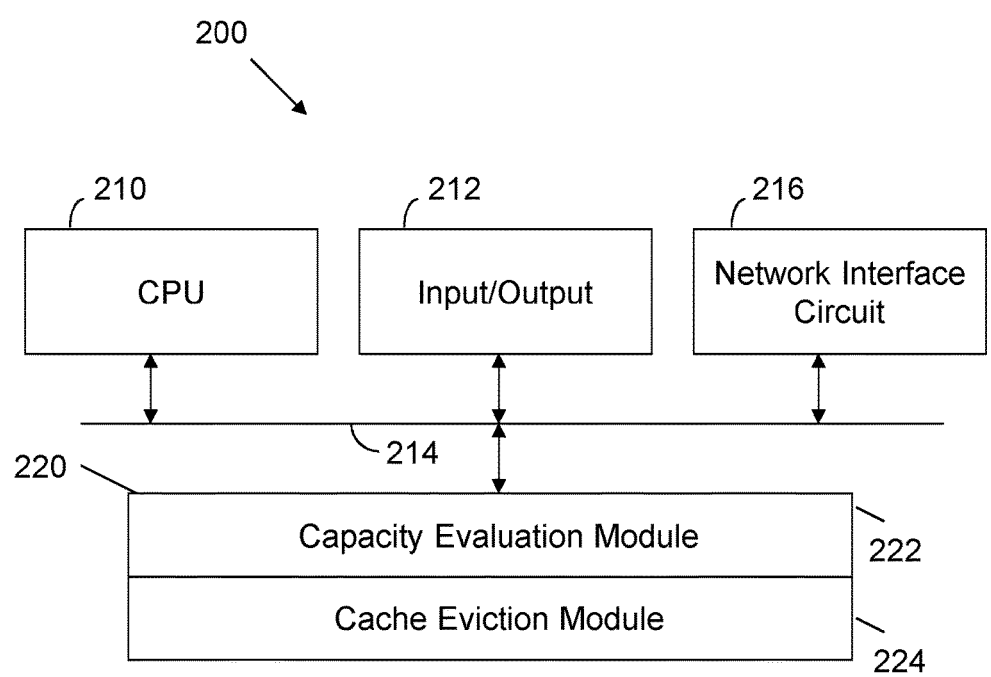
FIG. 2 illustrates a cache server configured in accordance with an embodiment of the invention.

FIG. 2 illustrates a cache server 200 configured in accordance with an embodiment of the invention. The cache server 200 includes standard components, such as a central processing unit 210 and input/output devices 212 connected via a bus 214. The input/output devices 212 may include a keyboard, mouse, touch display and the like. A network interface circuit 216 is also connected to the bus 214 to provide connectivity to a network, such as the system of FIG. 1.

A memory 220 is also connected to the bus 214. The memory 220 stores instructions executed by the central processing unit 210 to implement operations of the invention. In particular, the memory 220 stores a capacity evaluation module 222. The cache server 200 is one node of many nodes of a distributed cache. The distributed cache has an aggregate capacity. The aggregate capacity is monitored by the capacity evaluation module 222. However, for any given data entry operation, it is desirable to evaluate the local cache capacity without having to communicate with other networked machines of the distributed cache. The capacity evaluation module 222 evaluates local cache capacity without communicating with other networked machines, as discussed below.

The memory 220 also stores a cache eviction module 224. The cache eviction module 224 includes instructions executed by the central processing unit 210 to evict content from the cache. The cache eviction module 224 is configured to evict cache content on a probabilistic basis. That is, the methodology is configured so that there is a high probability that the evicted content is a good candidate for eviction. Systems typically endeavor to evict content on a deterministic basis. That is, evict content that is deterministically established as the best candidate for eviction.

Figure 3:
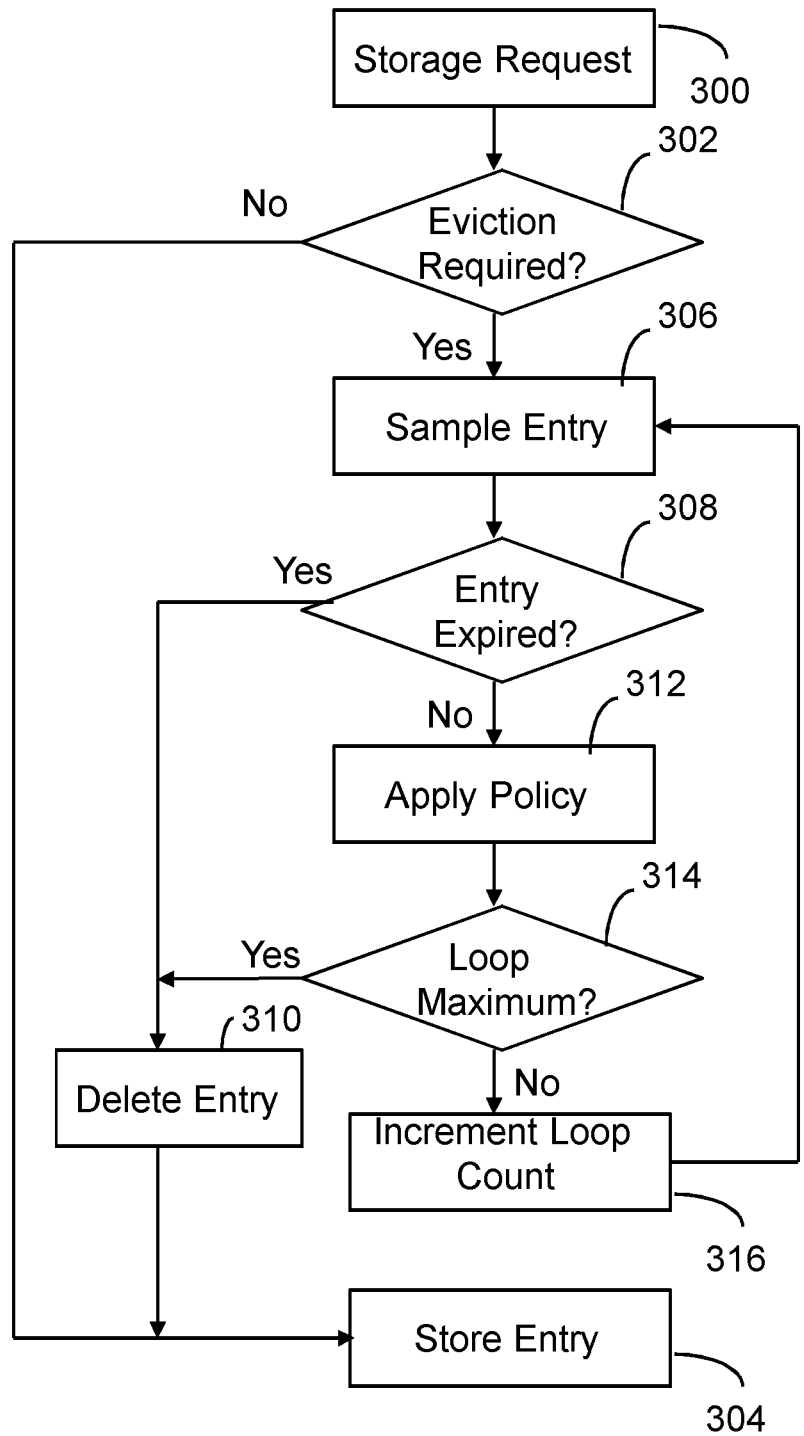
FIG. 3 illustrates cache eviction operations performed in accordance with an embodiment of the invention.

FIG. 3 illustrates processing operations associated with an embodiment of the cache eviction module 224. A storage request is received 300. The cache eviction module 224 then determines whether eviction is required 302. Observe that a cache eviction decision is made for every received entry. Intuitively, one of skill in the art might think that this is an expensive approach. However, this is not done by checking the real cache size across the cluster. Rather, the computation is performed locally. In one embodiment, only the local cache size is evaluated. Any number of measures may be used to decide whether eviction is required based upon the local cache size. For example, an entry count may be maintained. When the number of entries exceeds a threshold, eviction is required.

Another approach is to track used native memory size. In particular, a maximum used native memory size is established as a threshold. Eviction is required when the threshold is exceeded. Alternately, a used native memory percentage may be specified as a threshold. The used native memory percentage is relative the maximum native memory size.

Another approach is to specify a free native memory size. In this case, a minimum free native memory size is specified as a threshold. If the free native memory size goes below the threshold, eviction is performed. Finally, a free native memory percentage may be specified. In particular, if the free native memory percentage relative to the maximum native memory size goes below a threshold, then eviction is performed.

A more sophisticated approach based upon the global cache size may also be used. That is, global cache size considerations are used to estimate a maximum local partition size. But even with this approach, only local computations are performed to eliminate the expense of communicating with other machines. In one embodiment, the global cache size computation considers a balanced partition size, an approximated standard deviation, and a standard deviation multiplier to define a maximum partition size. The following pseudo code demonstrates an example of this approach:

```
def [balanced-partition-size]
def [approximated-std-dev]
def [std-dev-multiplier]
def [max-partition-size]
//First, a balanced partition size is defined, which is the size
//if all entries are distributed equally on all partitions.
    [balanced-partition-size]=[max-entry-count]/[partition-count]
//An estimated standard deviation is defined. Test results indicate that the standard deviation
//corresponds to the square root of the balanced partition size.
    [approximated-std-dev]=sqrt([balanced-partition-size])
//A standard deviation multiplier is then defined. The multiplier is a function of the size of
//the maximum entry count. That is, the smaller the maximum entry count, the larger the
//multiplier.
    if ([max-entry-count]<=4000) then
    [std-dev-multiplier]=5
    else if ([max-entry-count]>4000 && [max-entry-count]<=1000000) then
    [std-dev-multiplier]=3
    else
    [std-dev-multiplier]=0
end if
//A maximum partition size is then computed.
    [max-partition-size]=(([approximated-std-dev]*[std-dev-multiplier])+[balanced-partition-size])
//If the size of the current partition is bigger than the maximum partition size, apply eviction.
    if ([current-partition-size]>=[max-partition-size])
    doEviction( );
//Put entry to cache
    putEntry(key, value);
```

If eviction is not required (302—No), the entry is simply stored 304 at an available location. If eviction is required (302—Yes), an entry in the cache is sampled 306. In one embodiment, 15 entries are randomly sampled from the cache on machine 200. By way of example, the cache would typically have at least 100,000 entries and therefore the sample size is relatively small. The random sample technique supports O(1) selection of random entries. By sampling entries from the partition that the insert is operating on, a probabilistic best value is found, as opposed to a deterministic value that would need to be identified across the entire distributed cache. This probabilistic approach has the advantage of not requiring any network operations or cross partition operations. Consequently, it is very fast.

In one embodiment, each entry in the cache has a creation time, an indication of the last time that it was accessed, and an indication of the number of hits. The creation time may be used to determine whether an entry has exceeded an expiration time. If so (308—Yes), the sampled entry is deleted 310 and the new entry is stored 304. If the entry has not expired (308—No), a policy is applied 312.

The indication of the last time that an entry was accessed may be used to support a least recently used policy. Since the invention relies upon a sampling methodology, the least recently used policy is better characterized as a less frequently used policy. That is, the approach will find the least recently used entry in the sampled set, but it is unlikely that the least recently used entry in the sampled set is the least recently used entry across the entire cache, hence the reference to a less frequently used policy. This is an example of the probabilistic approach used, as opposed to a deterministic approach, which would find the least recently used entry across the entire cache.

The indication of the number of hits for an entry may be used to support a least frequently used eviction policy. Once again, the policy is probably better characterized as a less frequently used eviction policy because the eviction is based upon a sampled subset of the cache.

The operation of applying the policy 312 may be omitted on the first pass through the processing loop. That is, in the first pass through the processing loop, the first entry considered is automatically designated the entry to evict because there are no other candidates. On subsequent passes through the loop, a new entry is compared against the stored best entry candidate from prior loops. If a subsequent loop finds a candidate better than the stored candidate, then the stored candidate is replaced with the candidate from the subsequent loop.

After policy application, it is determined whether the maximum number of loops has been reached 314. If so (314—Yes), the stored best entry candidate for eviction is deleted 310 and the new entry is stored 304. If the maximum number of loops has not been reached (314—No), then control returns to blocks 306.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A cache server operative as one of a plurality of cache servers of a distributed cache, comprising:
 a processor; and
 a memory connected to the processor, the memory storing instructions executed by the processor to:
  receive a cache storage request,
  establish a cache eviction requirement in response to the cache storage request,
  identify an evict entry within a cache of the cache server in response to the cache eviction requirement, wherein the evict entry is selected from a random sampling of entries within the cache, wherein the random sampling of entries is a random sampling of less than 1% of entries within the cache and wherein the evict entry is subject to an eviction policy that identifies a probabilistically favorable eviction candidate within the random sampling of entries without deterministically identifying a favorable eviction candidate of all entries within the cache,
  remove the evict entry from the cache, and
  load content associated with the storage request into the cache.

2. The cache server of claim 1 wherein the cache eviction requirement is established by estimating the capacity of the cache without communicating with other cache servers of the plurality of cache servers.

3. The cache server of claim 2 wherein the cache eviction requirement is established by evaluating cache size at the cache server.

4. The cache server of claim 2 wherein the cache eviction requirement is established by estimating a maximum cache size at the cache server as a function of the global cache size of the plurality of cache servers.

5. The cache server of claim 4 wherein estimating the maximum cache size at the cache server is established as a function of a balanced partition size, an approximated standard deviation, and a standard deviation multiplier.

6. The cache server of claim 5 therein the balanced partition size is defined as a maximum entry count divided by a partition count.

7. The cache server of claim 5 wherein the approximated standard deviation is the square root of the balanced partition size.

8. The cache server of claim 6 wherein the standard deviation multiplier is inversely proportional to the size of the maximum entry count.

9. The cache server of claim 1 wherein the evict entry is an expired entry.

10. The cache server of claim 1 wherein the eviction policy is a less recently used policy.

11. The cache server of claim 1 wherein the eviction policy is a less frequently used policy.

* * * * *